US011118117B2

(12) United States Patent
Vazquez et al.

(10) Patent No.: US 11,118,117 B2
(45) Date of Patent: Sep. 14, 2021

(54) REGULATORY CONTROLLER FOR USAGE IN A CATALYTIC OLEFINS

(71) Applicants: Jorge Javier Vazquez, Houston, TX (US); Surajit Dasgupta, Houston, TX (US); Michael Tallman, Houston, TX (US); Priyesh Harilal Thakker, Missouri City, TX (US)

(72) Inventors: Jorge Javier Vazquez, Houston, TX (US); Surajit Dasgupta, Houston, TX (US); Michael Tallman, Houston, TX (US); Priyesh Harilal Thakker, Missouri City, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 42 days.

(21) Appl. No.: 16/420,350

(22) Filed: May 23, 2019

(65) Prior Publication Data

US 2020/0369967 A1    Nov. 26, 2020

(51) Int. Cl.
*C10G 11/18* (2006.01)
*B01J 8/18* (2006.01)
*B01J 8/22* (2006.01)

(52) U.S. Cl.
CPC .......... *C10G 11/187* (2013.01); *B01J 8/1809* (2013.01); *B01J 8/22* (2013.01); *C10G 11/182* (2013.01); *B01J 2208/00548* (2013.01); *C10G 2300/1088* (2013.01); *C10G 2300/4075* (2013.01)

(58) Field of Classification Search
CPC ................ C10G 11/187; C10G 11/182; C10G 2300/1088; C10G 2300/4075

USPC ......................... 585/653, 648, 956
See application file for complete search history.

(56) References Cited

U.S. PATENT DOCUMENTS

| | | | | |
|---|---|---|---|---|
| 3,629,097 A | * | 12/1971 | Smith .................. | C10G 11/187 208/159 |
| 4,093,537 A | * | 6/1978 | Gross .................. | C10G 11/187 208/164 |
| 6,245,703 B1 | | 6/2001 | Kuechler et al. | |
| 2003/0163010 A1 | | 8/2003 | Xu et al. | |
| 2004/0069684 A1 | | 4/2004 | Tallman | |
| 2004/0192993 A1 | | 9/2004 | Lattner | |
| 2009/0192341 A1 | | 7/2009 | Beech | |

OTHER PUBLICATIONS

International Search Report and Written Opinion for International Application No. PCT/US2019/033665 filed May 23, 2019; dated Sep. 18, 2019.

* cited by examiner

*Primary Examiner* — Thuan D Dang
(74) *Attorney, Agent, or Firm* — Gary M. Machetta (57) ABSTRACT

An advanced regulatory controller for a converter of a catalytic olefins unit is disclosed. A Fluid Catalytic Cracking (FCC) type converter (i.e., reactor-regenerator) is combined with an ethylene style cold-end for product recovery. The regulatory controller operates using an Advanced Regulatory Control (ARC) application using variables, such as a controlled variable, four disturbance variables, associated variable, and a manipulated variable. The ARC application manipulates fuel oil or tail gas flow to a regenerator in response to an expected future steady state value of a regenerator bed temperature resulting from changes in the values of a selected set of the variables.

8 Claims, 4 Drawing Sheets

| Page 1 | REGENERATOR BED TEMPERATURE CONTROL | | | | | Next Page |
|---|---|---|---|---|---|---|
| Controlled Variable — 302 | Tag — 304 | Measured — 306 | Target — 308 | Units | Mode — 310 | |
| Regenerator Bed Temperature | TIC10R01_25 | TIC10R01_25.PV | TIC10R01_25.SP | Deg C | Mode | |
| Manipulated Variables — 312 | | Measured — 306 | Setpoint — 314 | Units | Mode | |
| Fuel Oil Flow | FIC10R01_8 | FIC10R01_8.PV | FIC10R01_8.SP | Kg/H | Mode | |
| Tail Gas Flow | FIC10R01_3 | FIC10R01_3.PV | FIC10R01_3.SP | Kg/H | Mode | |
| Associated Variable — 316 | | Measured — 306 | High Limit — 320 | Low Limit — 322 | Units | Available |
| Flue Gas Oxygen | AI10E03_2A | AI10E032A.PV | AI10E032A.HL | AI10E032A.LL | Mol% | On/Off |
| | | | Constraint Flag — 324 | Constraint Flag — 324 | | 326 |
| Disturbance Variables — 318 | | Measured — 306 | High Limit — 320 | Low Limit — 322 | Units | Available 326 |
| Feed Flow | FIC10P01_1 | FIC10P01_1.PV | FI10P01_1.HL | FI10P01_1.LL | Kg/H | On/Off |
| Feed Temperature | TIC10H01_3A | TIC10H01_3A.P | TI10H01_3A.HL | TI10H01_3A.LL | Deg C | On/Off |
| Disengager Temp | TI10R01_17 | TI10R01_17.PV | TI10R01_17.HL | TI10R01_17.LL | Deg C | On/Off |
| Stripper Level | LIC10R01_2(C) | LIC10R01_2.PV | LI10R01_2.HL | LI10R01_2.LL | Pct | On/Off |
| Combustion Air | FI15K01_1 | FI15K01_1.PV | FI15K01_1.HL | FI15K01_1.LL | Nm3/H | On/Off |
| Application State — 328 | On/Off | | | | | |

FIG. 3

REGENERATOR BED TEMPERATURE CONTROL — 400

Page 2 — 402 | Previous Page

| | Value | Active — 404 | Measured — 406 | Units | Setpoint — 408 |
|---|---|---|---|---|---|
| Disturbance Var Gains | | | | | |
| T to Feed Flow | TTOW | On/Off | FIC10P01_1 | FIC10P01_1.PV | KG/H | SP |
| T to Feed Temperature | TTOFT | On/Off | TIC10H01_3A | TIC10H01_3A.P | Deg C | SP |
| T to Disengager Temp | TTODT | On/Off | TI10R01_17 | TI10R01_17.PV | Deg C | |
| T to Stripper Level | TTOSL | On/Off | LIC10R01_2 | LIC10R01_2.PV | Pct | SP |
| Manipulated Var Gains | | | | | |
| T to Fuel Oil Flow | TTOFUEL | On/Off | FIC10R01_8 | FIC10R01_8.PV | KG/H | SP |
| T to Tail Gas Flow | TTOTAIL | On/Off | FIC10R01_3 | FIC10R01_3.PV | KG/H | SP |
| Associated Var Gains | | | Associated Var | Measured | | |
| O2 to Fuel Oil | O2TOFUEL | On/Off | AI10E03_2A | AI10E03_2A.PV | Mol% | Lab/Analyzer |
| O2 to Tail Gas | O2TOTAIL | On/Off | | Constraint Flag | | Lab/Anylz Flag — 420 |
| O2 to Comb Air | O2TOAIR | On/Off | | | | |
| Controlled Variable | | | | | | |
| TIC10R01_25 | TIC10R01 25.P | Deg C | FI15K01_1 | FI15K01_1.PV | Nm3/H | |
| Cal Temperature | Tcal Value | Deg C — 414 | | | | Lab Input — Lab Value — 418 |

Adjusting Parameters — 410 | Suppression Factor — 412 | Integral Action | ΔW Value — 416

| | Suppression Factor | Integral Action | ΔW Value |
|---|---|---|---|
| Delta Fuel Oil Flow | K₁ Input | τ Input | ΔWfo Value |
| Delta Tail Gas Flow | K₂ Input | τ Input | ΔWtg Value |

Reset Default Values — 422

FIG. 4

REGULATORY CONTROLLER FOR USAGE IN A CATALYTIC OLEFINS

CROSS-REFERENCE TO RELATED APPLICATIONS

This application claims priority from U.S. Provisional Application Ser. No. 62/675,452 filed on May 23, 2018, the entire disclosure of which is incorporated herein by reference in its entirety.

FIELD OF THE DISCLOSURE

The present disclosure relates to catalytic olefins conversion. More particularly, the present disclosure relates to regenerator bed temperature control of a catalytic conversion unit.

BACKGROUND

Olefins are a class of chemicals such as ethylene, propylene, and butylene. The olefins are building blocks for a wide variety of products such as plastics, rubbers, and solvents. Further, the olefins are produced from natural gas liquids and refinery products such as naphtha, kerosene, and gas oil. A wide variety of processes may be used to produce, recover, and convert the olefins. Olefins may be produced using Olefin producing technologies such as, but not limited to, steam cracking, Fluid Catalytic Cracking (FCC) and catalytic dehydrogenation (CATOFIN®). Further, olefins may be recovered using light olefins recovery technology. Olefins are converted to higher valued products such as, but not limited to, polyethylene, polypropylene, and alkylate. Olefins may be converted using Olefins conversion technology (OCT), ethylene dimerization, and comonomer production technology (CPT).

One factor that plays an important role during an operation of the catalytic olefins technology is converter/regenerator bed temperature. The present disclosure is directed to effective control of regenerator bed temperature.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

In aspects, in the present disclosure an advanced regulatory controller for a converter of a catalytic olefins unit is described. A catalytic olefins technology, described henceforth, may provide a method for converting low value olefins streams to valuable propylene and ethylene products. In one case, the low value olefins streams may comprise mixed butenes, pentenes, Fluid Catalytic Cracking (FCC) light gasoline, and coker gasoline. In a current design of the catalytic olefins technology, an FCC type converter (i.e., reactor-regenerator) may be combined with an ethylene style cold-end for recovery of a product. Further, in the current design, the catalytic olefins technology may include innovative heat integration features and may be designed for a regenerator bed temperature control.

In certain arrangements, when the converter/regenerator bed temperature is 703° C., then the catalytic olefins technology works appropriately. However, when the converter/regenerator bed temperature falls below a design operating point of 703° C., then excessive afterburn may be experienced in a regenerator part of the converter and a flue gas system during initial operations. Therefore, the converter/regenerator bed temperature of 720° C. or even 730° C. may be needed to reduce the afterburning.

Further, the converter/regenerator bed temperature may swing significantly from disturbances in one or more variables such as feed rate, feed temperature, disengage overhead temperature, and stripper level. In some traditional Fluid Catalytic Converters (FCC), the feed rate, feed temperature, reactor temperature or stripper level changes at times, and coke make automatically moves in a correct direction to minimize the impact on the converter/regenerator bed temperature. However, in other FCC processes, very little fuel is provided by the coke on a catalyst, thus intrinsic balancing mechanisms is missing. Embodiments of the present disclosure provide system and method to control regenerator bed temperature.

Figure 1:
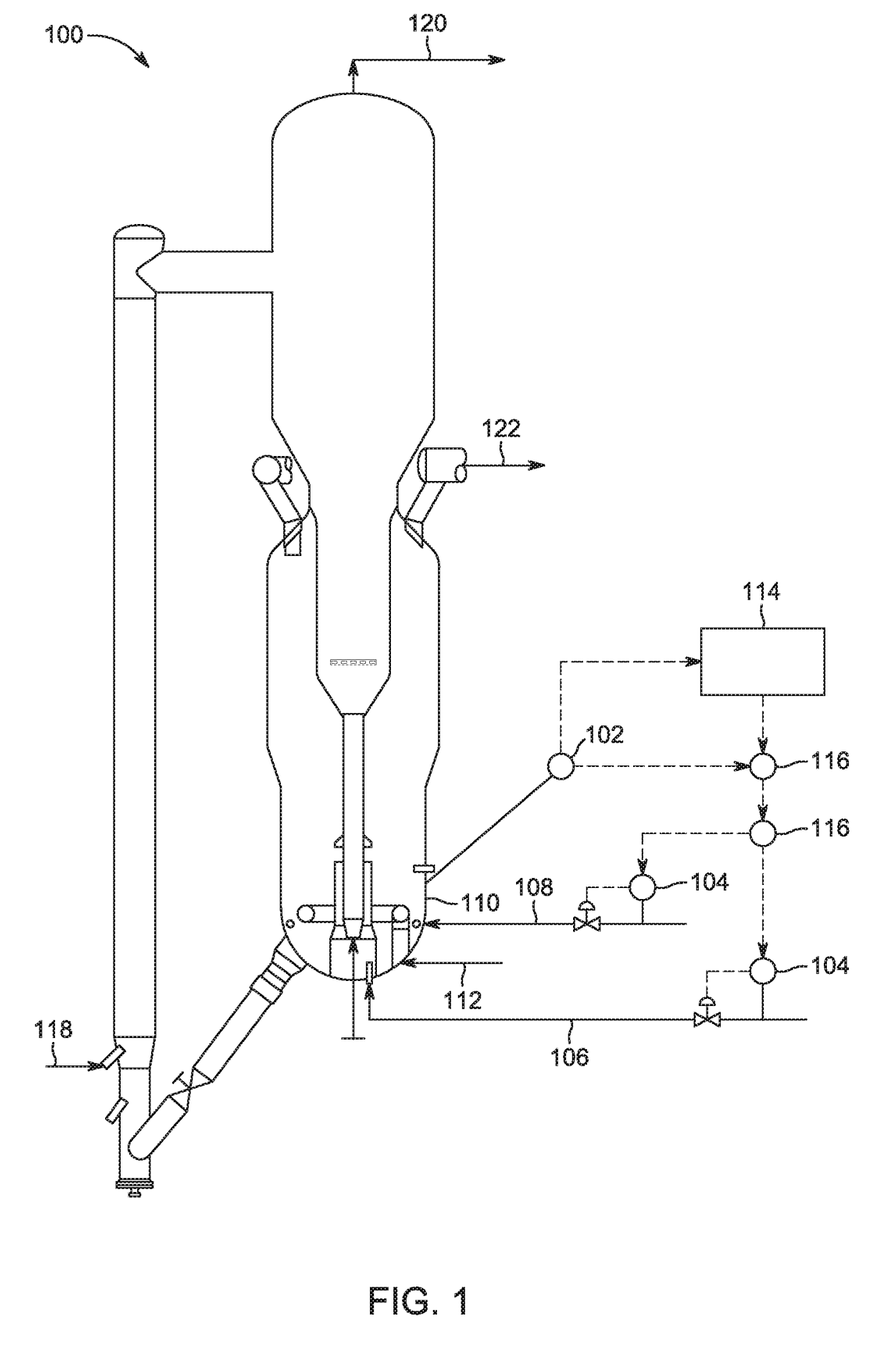
FIG. 1 depicts an illustrative system diagram 100 utilizing an Advanced Process Control (APC)/Advanced Regulatory Control (ARC) strategy for conversion of catalytic olefins, according to an embodiment.

FIG. 1 depicts an illustrative system diagram 100 utilizing an Advanced Process Control (APC)/Advanced Regulatory Control (ARC) strategy for conversion of catalytic olefins. As shown in FIG. 1, under regulatory control, a regenerator bed temperature controller 102 may be directly cascaded to a flow controller 104 (i.e., FIC controller) of fuel oil 106 or tail gas 108 feed to a regenerator 110. Further, the regenerator 110 may receive combustion air 112 and an olefin feed 118. The regenerator 110 outputs an effluent 120, which may be a product, and a flue gas 122. The regenerator bed temperature controller 102 and the flow controller 104 may henceforth be referred interchangeably as TIC controller 102 and FIC controller 104 respectively.

In an APC/ARC mode, the flow controller 104 of the fuel oil 106 or the tail gas 108 may receive a setpoint from an Advanced Process Control (APC) application controller 114. It should be noted that an operator may switch an operation from a basic TIC control to the APC application controller 114 using a selector (i.e., a DCS selector) or a local/remote switch on the TIC controller 102. Hereinafter, the terms APC application and ARC application may be used interchangeably. The controller 114 may be a general purpose computer having processors, memory, and algorithms.

The APC application may include selectors 116 for controlling a manipulated variable, such as flow of the tail gas ($W_{TG}$) 108 or the fuel oil 106 ($W_{FO}$). For example, in one case, an initial setting of the manipulated variable may be used for controlling flow of the fuel oil 106. Further, the APC application may include a controller variable such as a regenerator bed temperature (T) and disturbance variables such as feed rate 118 (i.e., feed flow) to a unit ($W_F$), feed temperature ($T_F$), disengager overhead temperature ($T_{DT}$), stripper level ($S_L$), and combustion air rate ($A_F$). The APC application may further include associated variables such as a flue gas excess oxygen composition ($O_{PV}$).

It should be noted that a basic design of the ARC application may be equivalent to a model predictive controller. The model predictive controller may be used to provide a feed forward element to the TIC controller 102, and thus may allow the TIC controller 102 to be more aggressive while retaining robustness of control. In the model predictive controller, a control action may be represented using below provided control equation 1:

$$d(O) = G(\varepsilon) + \frac{1}{\tau} \int \varepsilon d \qquad \text{Equation 1}$$

In above mentioned equation 1, "$\varepsilon$" denotes model predictive error, i.e., SP−PV*, where PV* represents a model predicted steady state value of a Process Variable (PV).

Further, the above mentioned equation 1 may correspond to a Proportional Integral (P-I) controller. It should be noted that such form of APC/ARC controller may fall in a general class of controllers, i.e., a Generalized Predictive Controller (GPC). Further, a strategy of the Generalized Predictive Controller (GPC) may be used for small applications and/or for cases where model prediction may be explicitly derived. Strategy of the Generalized Process Controller (GPC) may be further employed, where a basic control strategy may be represented using a below provided equation 2.

$$d(W_{FO}) = G(dT) + \frac{1}{\tau} \int dT dt \qquad \text{Equation 2}$$

Further, the basic control strategy may be defined in a discrete form, using a below provided equation 3.

$$\Delta W_{FO} = K_1 * (G_{FO})^{-1} * \Delta T + \frac{1}{\tau}(\Delta T_1 - \Delta T_2) \qquad \text{Equation 3}$$

Thus, a new setpoint for the fuel oil, $W_{FO}$, may be determined using a below provided equation 4.

$$W_{FO} = W_{FO\ current} + \Delta W_{FO} \qquad \text{Equation 4}$$

In above provided equation 3 and equation 4, "$\Delta W_{FO}$" indicates fuel oil setpoint change from the ARC application adjusted by flue gas excess oxygen composition. "$W_{FO\ current}$" indicates a current value of the fuel oil or the fuel gas flow rate setpoint. "$\Delta T$" indicates bed temperature difference between the setpoint ($T_{SP}$) and the ARC calculated predicted value ($T_{cal}$), where $\Delta T = T_{SP} - T_{cal}$. "$K_1$" indicates a move suppression parameter used for tuning size of change in the manipulated variable ($\Delta W_{FO}$). "$\tau$" denotes an integral time parameter of the controller, and 0 and 1 subscripts used with $\Delta T$ denotes values of a parameter at a previous period of time and at a current period of time.

"$G_{FO}$" denotes estimated gain between the regenerator bed temperature and flow of the fuel oil (i.e., obtained by steady state step tests in a commercial unit), and is calculated using below provided equation 5.

$$G_{FO} = \partial T/\partial W_{FO} \qquad \text{Equation 5}$$

Similarly, "$G_{TG}$" i.e. estimated gain between the regenerator bed temperature and the flow of the tail gas may be determined using below mentioned equation 6.

$$G_{TG} = \partial T/\partial W_{TG} \qquad \text{Equation 6}$$

Further, the predicted regenerator bed temperature may be determined as a sum of current measured temperature and a predicted change due to changes in any or all of the disturbance variables, using below mentioned equation 7

$$T_{cal} = T_{PV,0} + \Delta T_{cal} \qquad \text{Equation 7}$$

In above mentioned equation 7, "$T_{PV}$" indicates a measured value of the regenerator bed temperature at the previous time period (or one time period before). In one case, when ARC execution time is fast, then the difference between $T_{PV,1}$ and $T_{PV,1}$ may be marginal; therefore, for the purposes of implementation, a current $T_{PV,1}$ value may be used in place of a previous value, i.e., $T_{PV,0}$.

$\Delta T_{cal}$, mentioned in above equation 7, denotes an expected future change in the regenerator bed temperature due to changes in the disturbance variables. Further, $\Delta T_{cal}$ may be considered as a linear function of gains between the regenerator bed temperature and the disturbance variables, as defined below using equation 8.

$$\Delta T_{cal} = (\partial T/\partial W_F)*\Delta W_F + (\partial T/\partial T_F)*\Delta T_F + \\ (\partial T/\partial T_{DT})*\Delta T_{DT} + (\partial T/\partial S_L)*\Delta S_L + (\partial T/\partial W_A)*\Delta W_A \qquad \text{Equation 8}$$

$\Delta T_{cal}$ may be represented in a vector notation using below provided equation 9.

$$\Delta T_{cal} = [G_F\ G_{TF}\ G_{DT}\ G_{SL}\ G_A] \begin{bmatrix} \Delta W_F \\ \Delta T_F \\ \Delta T_{DT} \\ \Delta S_L \\ \Delta W_A \end{bmatrix} \qquad \text{Equation 9}$$

Further, $\Delta T_{cal}$ may include additional constants that may allow an operator's selection of the disturbance variables to be included in the ARC application, as defined below using equation 10.

$$\Delta T_{cal} = C_1*G_F*\Delta W_F + C_2*G_{TF}*\Delta T_F + C_3*G_{DT}*\Delta T_{DT} + \\ C_4*G_{SL}*\Delta S_L + C_5*G_A*\Delta W_A \qquad \text{Equation 10}$$

In above mentioned equation 10, values of constants C1, $C_2$, $C_3$, $C_4$, and $C_5$ may be '1' while the disturbance variables are considered during calculation of "$\Delta T_{cal}$" and values of the constants $C_1$, $C_2$, $C_3$, $C_4$, and $C_5$ may be '0' while the disturbance variables are not used during calculation of $\Delta T_{cal}$. "$\Delta W_F$" denotes a change in feed flow to the unit i.e. $W_{F1} - W_{FO}$, from time to to the time $t_1$, where $t_1 > t_0$ and ($t_1 - t_0$) define the ARC time period.

Further, $G_F$ may be calculated as $\partial T/\partial W_F$, where $G_F$ denotes estimated steady state gain between the regenerator bed temperature and the feed flow. $\Delta T_F$ denotes a change in feed temperature to the unit, $T_{F1} - T_{FO}$, from time $t_0$ to time $t_1$. $G_{TF}$ may be calculated as $\partial T/\partial T_F$, where $G_{TF}$ denotes estimated steady state gain between the regenerator bed temperature and the feed temperature. $\Delta T_{TD}$ denotes change on the disengager overhead temperature to the unit, $T_{TD1} - T_{TD0}$, from time $t_0$ to time $t_1$. Further, $G_{DT}$ denotes estimated steady state gain between the regenerator bed temperature and the disengager overhead temperature, and may be determined as $\partial T/\partial T_{DT}$. Further, $\Delta S_L$ denotes a change on the stripper level in the unit, $S_{L1} - S_{L0}$, from time $t_0$ to time $t_1$. $G_{SL}$ denotes estimated steady state gain between the regenerator bed temperature and the stripper level, and may be determined as $\partial T/\partial S_L$. $\Delta W_A$ denotes a change in the combustion air flow rate to the unit, $W_{A1} - W_{A0}$, from time $t_0$ to time $t_1$. $G_A$ denotes estimated steady state gain between the regenerator bed temperature and the combustion air flow rate, and may be determined as $\partial T/\partial W_A$.

Additionally, other disturbance variables such as, but not limited to, air temperature, gain, and constant may also be included in the equation 10 for calculating $\Delta T_{cal}$, without departing from the scope of the disclosure. As discussed above, the ARC application may include the associated variable. The associated variable may comprise flue gas excess oxygen composition ($O_{PV}$) that may constrain change in the flue gas flow rate setpoint. It should be noted that a change in the flue gas excess oxygen composition may be linearly dependent on the combustion air flow rate change and the fuel flow rate change to the regenerator 110. Using the calculated value of the fuel oil 106 change ($\Delta W_{FO}$), change in the value of the flue gas excess oxygen composition may be determined using below mentioned equation 11 or equation 12.

$$\Delta O_{cal} = (\partial O / \partial W_A) * \Delta W_A + (\partial O / \partial W_{FO}) * \Delta W_{FO} \quad \text{Equation 11}$$

$$\Delta O_{cal} = G_{OA} * \Delta W_A + G_{FO} * \Delta W_{FO} \quad \text{Equation 12}$$

In above provided equation 11 and equation 12, "$\Delta O_{cal}$" denotes expected future change in the flue gas excess oxygen composition due to changes in the disturbance variables. $G_{OA}$ denotes estimated steady state gain between the flue gas excess oxygen composition and the combustion air flow rate, and may be determined using $\partial O / \partial W_A$. $\Delta W_A$ denotes a change in the combustion air flow rate to the unit, $W_{A1} - W_{AO}$, from time $t_0$ to time $t_1$, where $t_1 > t_0$ and ($t_1 - t_0$) define the ARC time period. $G_{FO}$ denotes estimated steady state gain between the flue gas excess oxygen composition and the fuel gas flow rate, and may be determined as $\partial O / \partial W_{FO}$. $\Delta W_{FO}$ denotes calculated value of the change in fuel gas flow rate from a previous calculation of the fuel gas flow rate.

The parameters such as $G_F$, $G_{TF}$, $G_{DT}$, $G_{SL}$, and $G_A$, defined in the equation 9 and equation 10 and the parameters $G_{OA}$ and $G_{FO}$ defined in the equation 12 may be obtained by steady state step tests in the operating unit. The steady state step tests may be described later. Further, upper and lower limits on the flue gas excess oxygen composition may be defined and entered through a DCS field. It should be noted that the fuel supplied to the regenerator 110 may be limited when calculated change in flue gas excess oxygen composition forces the oxygen composition to be outside the limits. Thus, a limit checking may be performed using the below mentioned equation 13.

$$\Delta O_{UP} = O_{UP} - O_{PV}, \text{ and } \Delta O_{LO} = O_{LO} - O_{PV} \quad \text{Equation 13}$$

In above mentioned equation 13, $\Delta O_{UP}$ denotes a difference between the flue gas excess oxygen composition value ($O_{PV}$) and an upper limit for oxygen composition in the flue gas ($O_{UP}$), and $\Delta O_{LO}$ denotes a difference between the flue gas excess oxygen composition value ($O_{PV}$) and a lower limit for oxygen composition in the flue gas ($O_{LO}$). Further, $O_{PV}$ is a process value obtained from an analyzer or from a lab report.

In one case, while $\Delta O_{CAL} \geq \Delta O_{UP}$, change in the fuel oil setpoint may be constrained using below mentioned equation 14.

$$\Delta W_{FO} = \Delta W_{FO} \cdot (\Delta O_{UP} / \Delta O_{CAL}) \quad \text{Equation 14}$$

Similarly, while $\Delta O_{CAL} \leq \Delta O_{UP}$, change in the fuel oil setpoint may be constrained using below mentioned equation 15.

$$\Delta W_{FO} = \Delta W_{FO} \cdot (\Delta O_{LO} / \Delta O_{CAL}) \quad \text{Equation 15}$$

While the move limits are not violated, then a change in the fuel oil flow rate may not be constrained, i.e., the full move may be allowed, i.e., $\Delta W_{FO} = \Delta W_{FO}$. Additionally, two independent flags, $UP_{O2}$ and $LO_{O2}$ may be defined to indicate to the operator that the flue gas excess oxygen composition may be active. In one case, while $O_{PV} \geq O_{UP}$, then $UP_{O2}$=ON, otherwise $UP_{O2}$=OFF. In another case, while $O_{PV} \geq O_{LO}$, then $LO_{O2}$=ON, otherwise $LO_{O2}$=OFF.

It should be noted that a controller (i.e., TIC controller 102) may have high and low setpoint limits which may override the controller action, when the setpoint lies outside the limits. The change on the manipulated variable may have high and low limits, and may require a ramp function to adjust the setpoint smoothly and provide bumpless transfer from a regulatory action.

As discussed above, the parameters such as $G_F$, $G_{TF}$, $G_{DT}$, $G_{SL}$, and $G_A$ may be determined by the steady state step tests in the operating unit. For example, in a case, $G_F$ may be determined using the steady state step tests in the operating unit. Further, $G_F$ may be determined as the steady state gain value of $\Delta T/\Delta W_F$, where delta values of the variables may be determined from the steady state step tests on the operating unit or from an operator training simulator system. The steady state step tests may include steady state gains that may be estimated as a ratio of a discrete steady state change in the control variables i.e. the regenerator bed temperature, to a step change in the disturbance variables or the manipulated variable. It should be noted that following method may be used for estimating the steady state gains for $G_F$ computed as $\Delta T/\Delta W_F$.

At first, the operating unit may be running at a stable steady state. Further, a step change could be made on the feed flow controller. It should be noted that size of the change may be agreed with the operations before the test. Further, values of the variables may be recorded throughout the change in the feed flow 118 and at a steady state (T, $W_F$). Thereafter, an operator may wait until the operating unit reaches a steady state or some stable operation. Successively, a value of new temperature ($T_{new}$) may be recorded after the step change. Further, a value of change in the regenerator bed temperature ($\Delta T = T_{new} - T$) may be determined. It should be noted that the value of $\Delta W_F$ may be the difference between value of the feed flow 118 after and before the step change i.e., $\Delta W_F = W_{F,new} - W_F$. Thereafter, the value of the steady step gain ($G_F$) may be estimated as ratio of the difference values, i.e. $G_F = \Delta T/\Delta W_F$.

It will be apparent to one skilled in the art that the above-mentioned method for determining the gains may be applicable to other gains such as, but not limited to, gains of temperature with the flow rates of the fuel oil 106 and the tail gas 108 as well, without departing from the scope of the disclosure.

Figure 2:
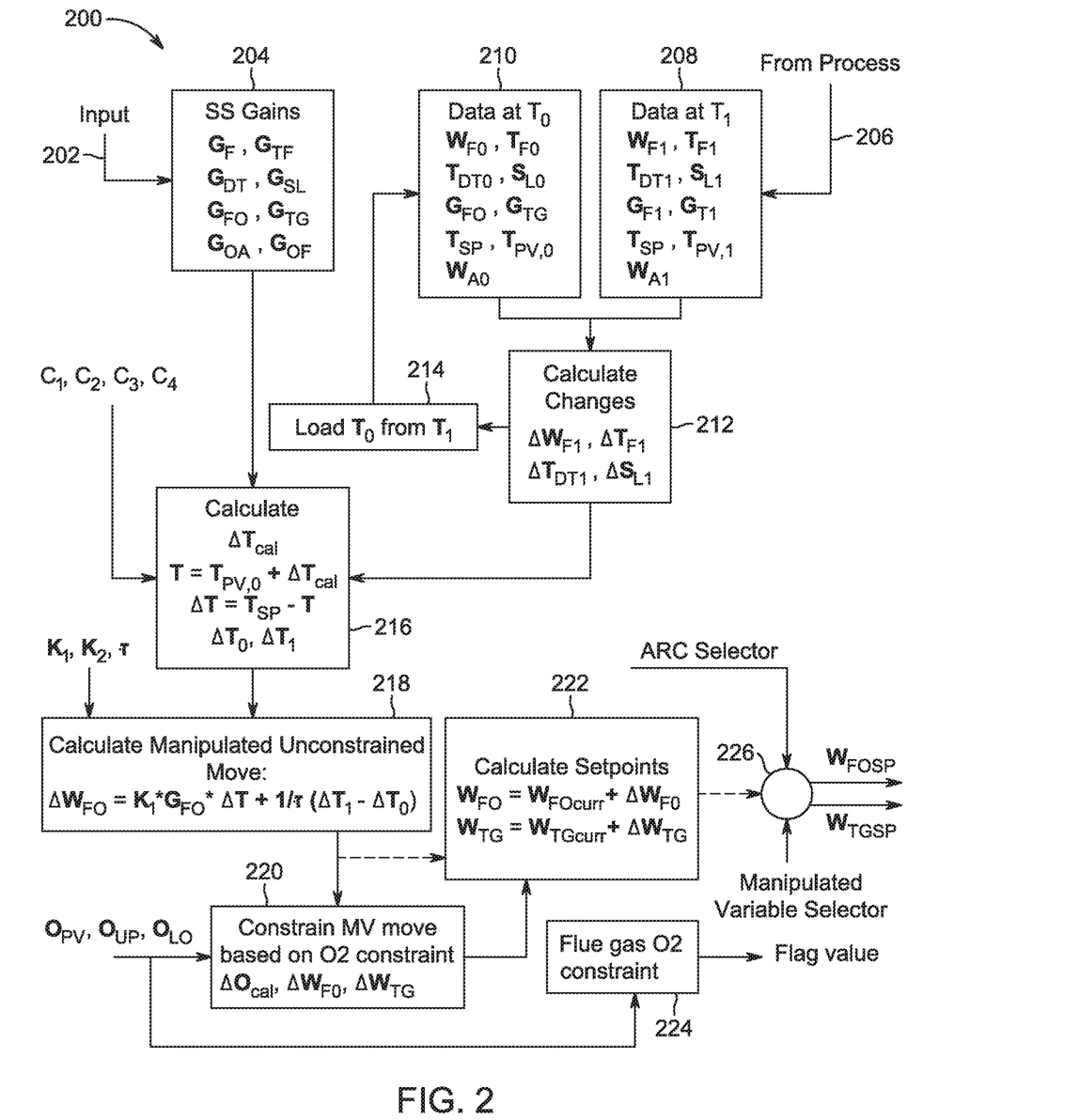
FIG. 2 depicts an illustrative block diagram 200 showing functioning of the APC/ARC strategy, according to an embodiment.

FIG. 2 depicts an illustrative block diagram 200 showing functioning of the APC/ARC strategy. A configuration of a controller (i.e., TIC controller 102) may be implemented in a DCS system, not requiring an additional hardware or software.

At first, the ARC application may receive one or more inputs (i.e., manual inputs) from an operator, at a step 202. The one or more inputs may include an ON/OFF activation of the ARC application, manipulated variable suppression factors $K_1$ and $K_2$, constants $C_1$, $C_2$, $C_3$, $C_4$, and $C_5$ ON/OFF binary variables for inclusion of variables gains in the ARC application, and ON/OFF activation parameter of the flue gas excess oxygen composition calculation to adjusting fuel oil 106 flow rate. Based on the received inputs, steady state gains for $G_F$, $G_{TF}$, $G_{DT}$, $G_{SL}$, $G_{FO}$, $G_{TG}$, $G_{DA}$, and $G_{OF}$ may be determined, at step 204. The steady state gains may be calculated using the steady state step tests in the operating unit.

Successively, the ARC application may receive one or more process inputs, at step 206. The process inputs may include, but not limited to, the feed rate 118 to the unit, feed temperature, disengager overhead temperature, stripper level, fuel oil flow, tail gas flow, regenerator bed temperature, flue gas excess oxygen composition, and combustion air rate. Further, data may be retrieved at $T_1$, at step 208. The data at $T_1$ may include $W_{F1}$, $T_{F1}$, $T_{DT1}$, $S_{L1}$, $G_{F1}$, $G_{T1}$, $T_{SP}$, $T_{PV,1}$, and $W_{A1}$. Similarly, data may be retrieved at $T_0$, at step 210. The data at $T_0$ may include $W_{F0}$, $T_{F0}$, $T_{DT0}$, $S_{L0}$, $G_{FO}$, $G_{TG}$, $T_{SP}$, $T_{PV,0}$, and $W_{A0}$.

Based on the received data at $T_1$ and $T_0$, change in values of variables i.e., $\Delta W_{F1}$, $\Delta T_{F1}$, $\Delta T_{DT1}$, and $\Delta S_{L1}$ may be calculated, at step 212. It should be noted that for each predefined period of time, $t_1-t_0$, the ARC application may calculate changes in the disturbance variables at the start of the time period ($t_0$) and at the end of the time period ($t_1$). Post calculation, the ARC application may load $T_0$ from $T_1$, at step 214. Further, the changes in the values of the variables along with the calculated steady state gains and the constants (i.e., $C_1$, $C_2$, $C_3$, $C_4$, and $C_5$) may be used to determine $\Delta T_{cal}$, at step 216. It should be noted that values of the constants may be provided by the operator in order to determine the $\Delta T_{cal}$. Further, the operator may decide which of the disturbance variable gains may be used to calculate the regenerator bed temperature by setting the values of the constants $C_1$, $C_2$, $C_3$, $C_4$, and $C_5$. Values of the constants may be set as '1' while in use, otherwise may be set as '0'.

Successively, a manipulated variable unconstrained move may be calculated, at step 218. The manipulated variable unconstrained move may be calculated based on move suppression parameters (i.e., $K_1$, $K_2$) and integral time parameter ($\tau$). The manipulated variable unconstrained move may be determined using below mentioned equation 16.

$$\Delta W_{FO} = K_1 * G_{FO} * \Delta T + 1/\tau(\Delta T_1 - \Delta T_0) \quad \text{Equation 16}$$

Based at least on the manipulated variable unconstrained move, flue gas excess oxygen composition value, and a process value, a manipulated variable move may be constrained, at step 220. Thereafter, setpoints (i.e., manipulated variable FIC setpoints) may be calculated, at step 222. The setpoints may be determined using below mentioned equation 17 and equation 18.

$$W_{FO} = W_{FOcurr} + \Delta W_{FO} \quad \text{Equation 17}$$

$$W_{TG} = W_{TGcurr} + \Delta W_{TG} \quad \text{Equation 18}$$

It should be noted that flue gas excess oxygen composition constraint may be retrieved and used as a flag value, at step 224. The flue gas excess oxygen composition may be retrieved based on inputs such as $O_{PV}$, $O_{UP}$, and $O_{LO}$. In a case, the flowrate change may be constrained by the flue gas excess oxygen composition calculation before the flowrate change may be applied to the FIC controller 104. Further, the ARC application may transmit the calculated setpoints to a controller 226. It should be noted that ARC selector and a manipulated variable selector may feed to the controller 226. Thereafter, the ARC application may change the flow rate of the fuel oil and the tail gas.

It should be noted that the predicted regenerator bed temperature may be compared with the setpoint ($T_{SP}$) and the difference may be used as an error value to determine the change in the manipulated variable ($W_F$). Further, the suggested ARC run frequency may be once per minute and may be easily tuned to run slower or faster depending on an observed quality of control. Further, in a case, the ARC setpoint may be applied to the flow controller 104 through a filter such as a ramp function, to ensure a smooth and bump less change in the manipulated variable value.

Figure 3:
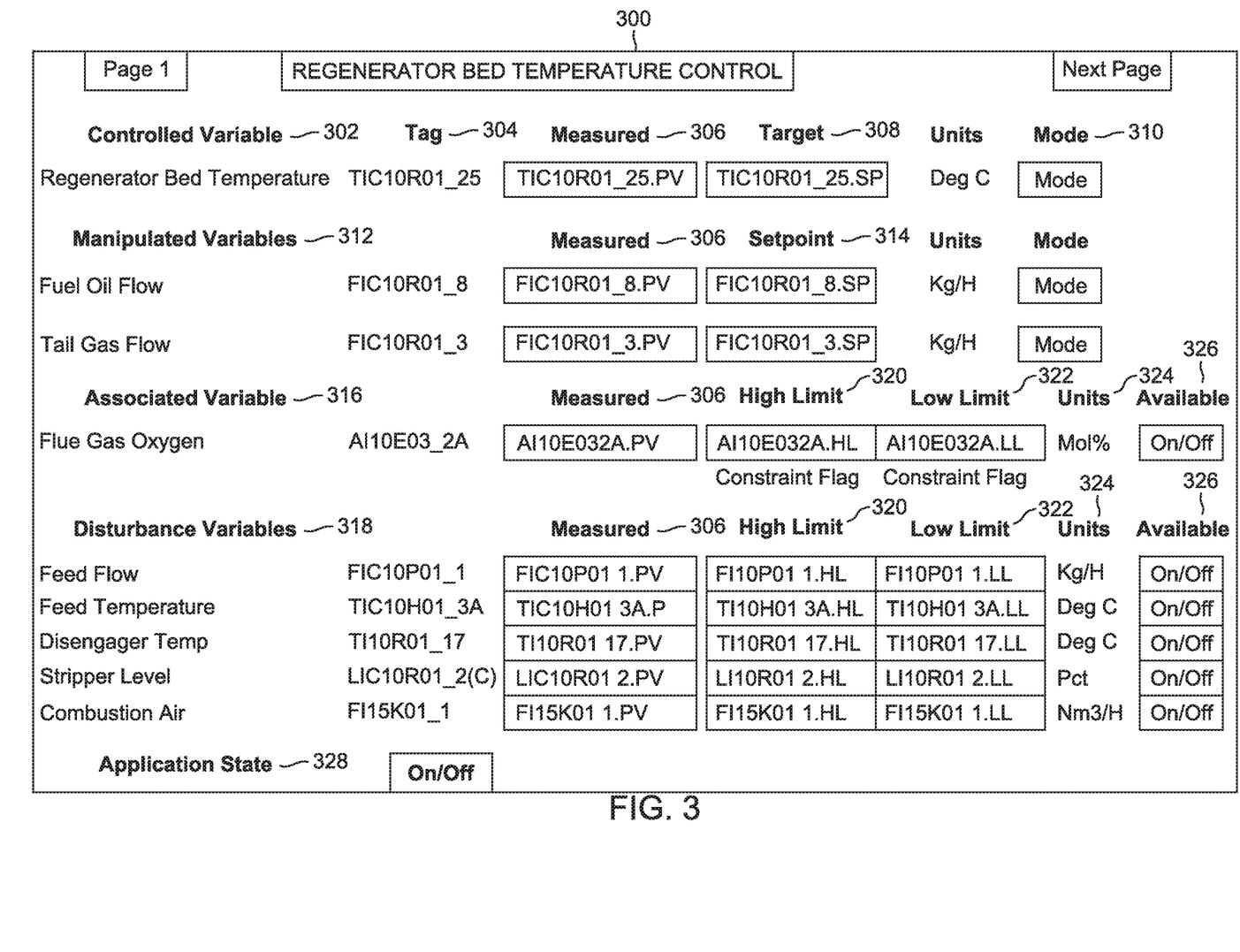
FIG. 3 depicts an illustrative DCS screen interface 300, according to an embodiment.

FIG. 3 depicts an illustrative DCS screen interface 300. The DCS screen interface 300 may be used by the operator to define all variables of the ARC application. The DCS screen interface 300 may display variables such as controlled variable 302 of the ARC application. Further, the DCS screen interface 300 may display a tag field 304 and a measured value field 306 of the variables. The tag field 304 may be selected from below provided table illustrating DCS Tags associated with variables of the ARC application.

|   | Tag         | Description                          | Units  |
|---|-------------|--------------------------------------|--------|
| 1 | FIC10P01_1  | Feed flow rate                       | Kg/H   |
| 2 | FIC10R01_8  | Fuel oil injection to regenerator    | Kg/H   |
| 3 | LIC10R01_2  | Stripper level                       | %      |
| 4 | TI10R01_17  | Disengager Dome*                     | DEGC   |
| 5 | TIC10HO1_3  | Feed temperature                     | DEGC   |
| 6 | TIC10R01_25 | Converter regenerator dense bed temp.| DEGC   |
| 7 | FIC10R01_3  | Tail gas flow rate                   | Kg/H   |
| 8 | AI10E03_2A  | Flue gas O2 analyzer                 | Mol %  |
| 9 | FI15K01_1   | Main air compressor discharge        | Nm3/h  |

The DCS screen interface 300 may further display a target field 308 of the controlled variable 302 that the operator may use to set a target value or a desired value, and a mode field 310. It should be noted that the mode field 310 may indicate which of the variables may be used to control the regenerator bed temperature. It should also be noted that in embodiments, the disengager temperature may be replaced by the controller TIC10R01_1 set point.

As shown in FIG. 3, the DCS screen interface 300 may further display manipulated variables 312 and the setpoint 314 of the manipulated variables. It should be noted that the mode may comprise MAN, AUTO, CASCADE, or REMOTE CASCADE, depending on the configuration of the manipulated variables 312. Further, the DCS screen interface 300 may display associated variables 316 and distributed variables 318 with high limits field 320, low limits field 322, unit(s) field 324, and an available field 326.

The high limits field 320 and the low limits field 322 may be changed by the operator and a flag constraint may be displayed to the operator as a change of color of the high limits field 320 and the low limits field 322. It should be noted that the flag constraint may be displayed when high limits and low limits may be reached and changed back when the high limits and the low limits are normal. The available field 326 may be changed by the operator i.e., ON/OFF to activate an adjustment of the fuel setpoint by the calculation of the flue gas excess oxygen composition. Further, the available field 326 may be used by the operator when the gain of the associated variable may be active in the ARC temperature calculation.

The DCS interface screen 300 may further display an application state field 328 that may be configured as a selector of the ARC application and the regulatory control. The application state field 328 may be used by the operator to set ON/OFF while the ARC application is active or inactive.

Figure 4:
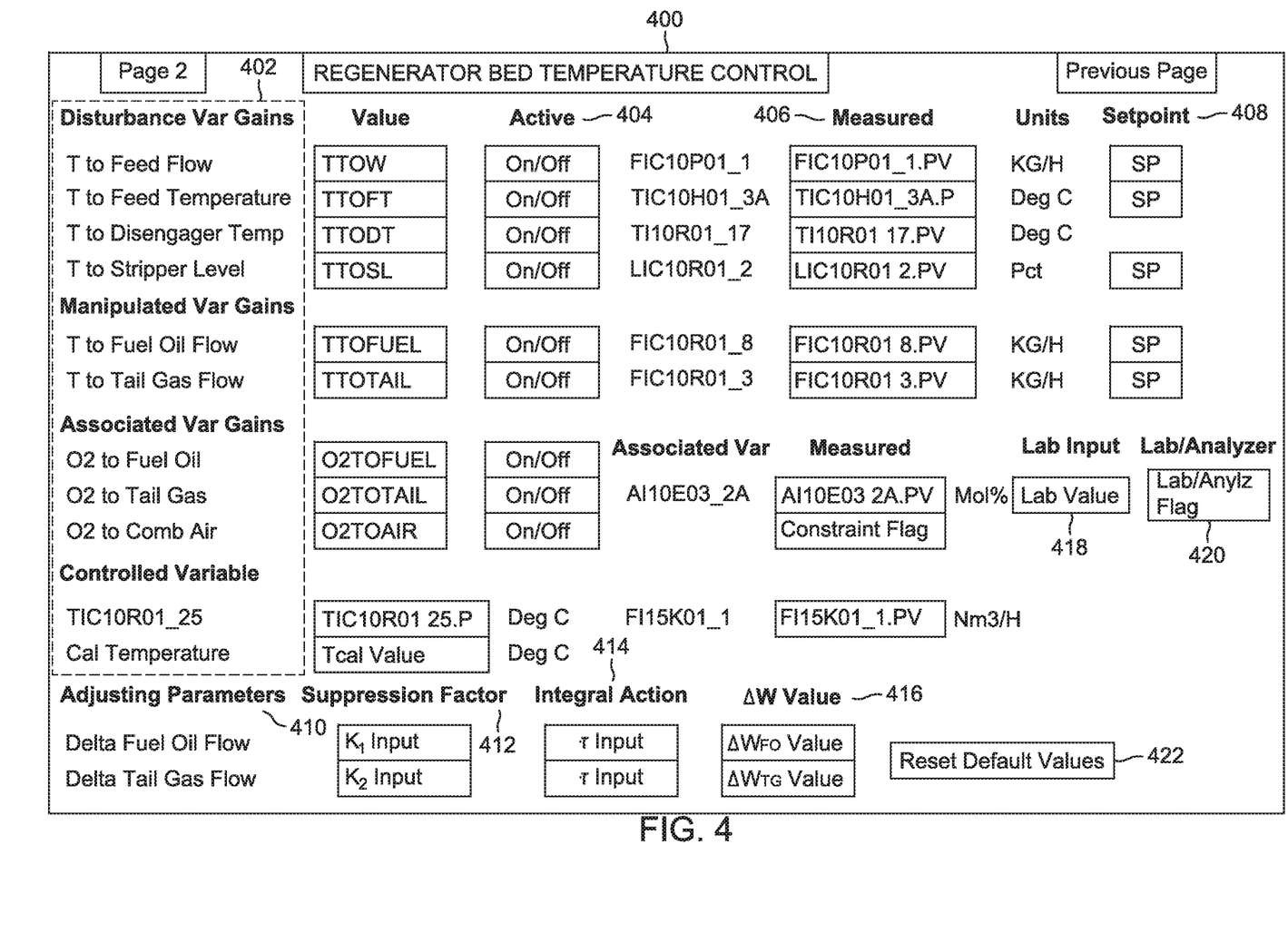
FIG. 4 depicts another illustrative DCS screen interface 400, according to an embodiment.

FIG. 4 depicts another illustrative DCS screen interface 400. The DCS interface screen 400 may be used by the operator to input values of parameters or constants for the ARC application. As shown in FIG. 4, an ARC estimated gains of variables 402 may be entered by the operator using the DCS interface screen 400. Further, the DCS interface screen 400 may include an active field 404 such as ON/OFF fields that may indicate about the flow used as the manipulated variable. The DCS interface screen 400 may further display measured values field 406 of the disturbance variables, the manipulated variables, and the controlled variables along with a setpoint field 408. It should be noted that values of the calculated temperature and the combustion air flowrate may also be displayed to the operator. Further, the DCS interface screen 400 may display adjusting parameters field 410 to the operator. The adjusting parameters field 410 may include suppression factor field 412, an integral action field 414, and ΔW value field 416. It should be noted that values of the adjusting parameters field 410 may be provided by the operator and thus may be helpful in tuning up the ARC application.

The DCS interface screen 400 may further display measured values field, lab input field 418, and a lab/analyzer field 420, of the associated variable. In a case, when the analyzer may not work, then a lab value may be entered by the operator in the lab input field 418. It should be noted that the lab input field 418, and the lab/analyzer field may allow the operator to set the value that may be used by the ARC application in the calculation. Further, a set of values may be selected as a default for gains, constants, and tuning values. The values may be replaced easily or restore with a use of a restore default values field 422.

The disclosed embodiments encompass numerous advantages. Various embodiments of an advanced regulatory controller for a converter of a catalytic olefins unit may be disclosed. The advanced regulatory model predictive feed forward Advanced Process Control (APC) or Advanced Regulatory Control (ARC) function may include feed-forward adjustments to the regenerator fuel in response to changes in the variables of the ARC application, and thus may result in minimizing swings in the regenerator bed temperature. Thus, functionality of the ARC application may allow the regenerator bed temperature to be maintained closer to the desired setpoint for low afterburning. Further, such system and method may include consideration of critical constraints to fuel combustion. Therefore, such operation of flue gas mechanical system will result in more stable operation and extended life of the flue gas mechanical systems.

From the above, it should be appreciated that what has been described includes a method of converting a olefin stream into a product stream. The method may include the step of feeding at least an olefin feed, a fuel oil, and a tail gas into a regenerator to produce an effluent stream; and operating the regenerator. Operating the generator may include the steps of determining at least one disturbance variable associated with the regenerator, the at least one disturbance variable being selected from one of: (i) an olefin feed rate, (ii) an olefin feed temperature, (iii) a disengager temperature, and (iv) a stripper level; predicting a change in the regenerator bed temperature based on the determined at least one disturbance variable; determining a setpoint for a flow rate of at least one input to a regenerator based on the predicted change in the regenerator bed temperature, wherein the at least one input is selected from one of: (i) a fuel oil, and (ii) a tail gas; feeding the effluent stream to generate the product stream.

In embodiments, a Distributed Control System (DCS) may be implemented to control the regenerator. As used herein, a DCS is a computer-based control system having control loops. Autonomous controllers are distributed throughout various components and devices making up the system. A central operator supervisory control oversees operation of the autonomous controllers. The autonomous controllers exchange data with the supervisory control using a suitable communication network.

From the above, it should be appreciated that what has been described also includes method of controlling the regenerator temperature in a general process of converting a olefin stream into a product stream. The method may include the steps of feeding at least an olefin feed, a fuel oil, and a tail gas into a regenerator to produce an effluent stream; operating the regenerator by: determining at least one disturbance variable associated with the regenerator, the at least one disturbance variable being selected from one of: (i) an olefin feed rate, (ii) an olefin feed temperature, (iii) a disengager temperature, and (iv) a stripper level; predicting a change in the regenerator bed temperature based on the determined at least one disturbance variable; and determining a setpoint for a flow rate of at least one input to a regenerator based on the predicted change in the regenerator bed temperature, wherein the at least one input is selected from one of: (i) a fuel oil, and (ii) a tail gas; and feeding the effluent stream to generate the product stream. Also, the controller may be implemented in a Distributed Control System.

The invention claimed is:

1. A method of controlling a regenerator bed temperature for a catalytic olefins unit, the regenerator receiving at least an olefin feed, a fuel oil, and a tail gas, the method comprising:
   determining at least one disturbance variable associated with the regenerator, the at least one disturbance variable being selected from one of: (i) a feed rate of the olefin feed received by the regenerator, (ii) a temperature of the olefin feed received by the regenerator, (iii) a temperature of the disengager of the regenerator, and (iv) a level of a stripper of the regenerator;
   predicting a change in the regenerator bed temperature based on the determined at least one disturbance variable;
   determining a setpoint for a flow rate of at least one regenerator input to a regenerator based on the predicted change in the regenerator bed temperature, wherein the at least one regenerator input is selected from one of: (i) a fuel oil, and (ii) a tail gas; and
   using the determined setpoint to control the regenerator bed temperature.

2. The method of claim 1, further comprising:
   determining at least one process input selected from one of: fuel oil flow, tail gas flow, regenerator bed temperature, flue gas oxygen content, and regenerator combustion air rate, wherein the setpoint is also determined based on the determined at least one process input.

3. The method of claim 1, further comprising: determining a gain in the regenerator bed temperature for a change in at least one disturbance variable and a change in the at least one regenerator input, wherein the setpoint is also determined based on the determined gain.

4. The method of claim 1, further comprising:
   determining an excess oxygen content in a flue gas from the regenerator; and
   constraining the setpoint based on the determined excess oxygen content.

5. The method of claim 1, further comprising:
   communicating the determined setpoint to a controller; and
   adjusting a valve using the controller to obtained the determined setpoint.

6. The method of claim 1, further comprising: displaying the determined setpoint to a human controller.

7. A method of controlling the regenerator temperature in a general process of converting a olefin stream into a product stream, comprising:

feeding at least an olefin feed, a fuel oil, and a tail gas into a regenerator to produce an effluent stream;

operating the regenerator by:

determining at least one disturbance variable associated with the regenerator, the at least one disturbance variable being selected from one of: (i) a feed rate of the olefin feed fed to regenerator, (ii) a temperature of the olefin feed fed to the regenerator, (iii) a temperature of the disengager of the regenerator, and (iv) a level of a stripper of the regenerator;

predicting a change in the regenerator bed temperature based on the determined at least one disturbance variable;

determining a setpoint for a flow rate of at least one input to a regenerator based on the predicted change in the regenerator bed temperature, wherein the at least one input is selected from one of: (i) a fuel oil, and (ii) a tail gas;

feeding the effluent stream to generate the product stream; and using the determined setpoint to control the regenerator bed temperature.

8. The method of claim 7, wherein the controller is implemented in a Distributed Control System.

\* \* \* \* \*